(12) United States Patent
Schücke et al.

(10) Patent No.: US 7,532,625 B2
(45) Date of Patent: May 12, 2009

(54) BLOCK TRANSFER FOR WLAN DEVICE CONTROL

(75) Inventors: Frank Schücke, Dresden (DE); Michael Fiedler, Dresden (DE); Attila Römer, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 782 days.

(21) Appl. No.: 10/756,238

(22) Filed: Jan. 13, 2004

(65) Prior Publication Data

US 2005/0117518 A1 Jun. 2, 2005

(30) Foreign Application Priority Data

Nov. 28, 2003 (DE) ................. 103 55 584

(51) Int. Cl.
*H04L 12/28* (2006.01)
(52) U.S. Cl. ...................... 370/392; 370/338
(58) Field of Classification Search .................. 370/235
See application file for complete search history.

(56) References Cited

U.S. PATENT DOCUMENTS

| | | | |
|---|---|---|---|
| 6,564,267 B1 | 5/2003 | Lindsay | |
| 6,614,836 B1 | 9/2003 | Halford et al. | |
| 6,690,715 B2 | 2/2004 | Webster et al. | |
| 6,694,372 B1 * | 2/2004 | Grossman | 709/236 |
| 6,954,450 B2 * | 10/2005 | Krischer et al. | 370/338 |
| 7,006,467 B2 * | 2/2006 | Anton et al. | 370/329 |
| 7,149,213 B1 * | 12/2006 | Rosner et al. | 370/379 |
| 7,149,888 B1 * | 12/2006 | Hart et al. | 713/2 |
| 7,313,104 B1 * | 12/2007 | Kern et al. | 370/310 |
| 2002/0089994 A1 * | 7/2002 | Leach et al. | 370/412 |
| 2004/0024915 A1 * | 2/2004 | Abe | 709/250 |
| 2004/0131035 A1 * | 7/2004 | Wakeley et al. | 370/338 |
| 2004/0240463 A1 * | 12/2004 | Ho et al. | 370/437 |

FOREIGN PATENT DOCUMENTS

EP 1133129 9/2001

* cited by examiner

*Primary Examiner*—Phirin Sam
(74) *Attorney, Agent, or Firm*—Meyertons Hood Kivlin Kowert & Goetzel, P.C.

(57) ABSTRACT

A block transfer technique is provided for controlling a data transfer to and/or from a WLAN (Wireless Local Area Network) device connected to a data processing system. The data processing system comprises an operating system independent access controller and a platform specific data block transfer engine. The operating system independent access controller is configured to prepare the platform specific data block transfer engine to perform the data transfer to and/or from the WLAN device.

46 Claims, 2 Drawing Sheets

BLOCK TRANSFER FOR WLAN DEVICE CONTROL

This application claims benefit of priority to German patent application 103 55 584.6 filed on Nov. 28, 2003.

BACKGROUND OF THE INVENTION

1. Field of the Invention

The invention generally relates to controlling WLAN (Wireless Local Area Network) devices connected to a data processing system, and in particular to a data processing system and method for controlling a data transfer to and/or from such a WLAN device.

2. Description of the Related Art

A wireless local area network is a flexible data communications system implemented as an extension to or as an alternative for, a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.11b that allows data rates of 5.5 and 11 Mbps in the 2.4 GHz spectrum. Further extensions exist.

Controlling a WLAN device usually requires some software running on a particular hardware platform. Such software needs to write data from the host to the device and read data from the device to the host. Thus, the software and the WLAN device need to support some transfer mechanism between the host CPU (Central Processing Unit) memory and the WLAN device. One possible transfer mechanism is the DMA (Direct Memory Access) mechanism.

In present computer systems, one way of relieving the central microprocessing unit of performing repetitive input/output functions is to avoid interrupts and to realize these functions by means of a DMA controller which is a control unit that enables direct memory access. Before the actual input/output process takes place, the processor initializes the DMA controller by writing initialization data to its registers, and the DMA controller is then able to independently perform data transfers between memory and interface. That is, during the phase where the control and address registers are initialized, the controller acts as slave. However, as soon as the controller receives a transfer request and begins data transmission, the controller independently performs bus cycles, i.e. it acts as master and shares the bus with the processor, for memory access.

FIG. 1 depicts a conventional system employing a DMA controller. In this system, the processor 100 is connected to the memory 105, the DMA controller 110 and a device control unit 120 that controls the peripheral device 125. Dependent on the mode of operation of the DMA controller 110, the data transfer between memory 105 and device control unit 120 may be performed directly or indirectly, i.e. by means of a buffer 115. In the direct transfer mode, the DMA controller 110 requires only one bus cycle per data item by addressing the memory 105 via the address bus and at the same time, addressing the interface data registers via a control line (single address mode). In the indirect transfer mode, the DMA controller 110 first performs a read cycle and stores the read data in the buffer 115. In a subsequent write cycle, the DMA controller 110 then transfers the buffered data to the respective target unit. Memory and interface are both addressed via the address bus (dual address mode).

While the DMA mechanism provides a data transfer technique that has many advantages when controlling devices such as WLAN devices, this technique cannot be used under all circumstances. For instance, situations exist where no bus master DMA is available in the WLAN device that is to be controlled.

Thus, the existing techniques suffer from the fact that they are strongly dependent on the used hardware and operating system. For instance, if the hardware and software are designed to use DMA, the architecture is limited to this mechanism. This is likewise true for other memory transfer techniques apart from DMA. Thus, the prior art software is limited to run on the respective specific hardware to use hardware acceleration mechanisms like DMA.

SUMMARY OF THE INVENTION

A data transfer control technique is provided for controlling the data transfer to and/or from a WLAN device, capable of extending the common way of abstraction of a hardware/software platform an application or device driver is running on, thereby allowing to use the capabilities of the hardware without limiting the software to run on this hardware only.

In an embodiment, a data processing system for controlling a data transfer to and/or from a WLAN device is provided where the WLAN device is connected to the data processing system. The data processing system comprises an operating system independent access controller and a platform specific data block transfer engine. The operating system independent access controller is configured to prepare the platform specific data block transfer engine to perform the data transfer to and/or from the WLAN device.

In another embodiment, a computer-readable storage medium is provided, storing instructions that when executed by a processor of a data processing system, operate the data processing system to control a data transfer to and/or from a WLAN device that is connected to the data processing system. The computer-readable storage medium comprises instructions to implement an operating system independent access controller, and instructions to implement a platform specific data block transfer engine. The operating system independent access controller is configured to prepare the platform specific data block transfer engine to perform the data transfer to and/or from the WLAN device.

In a further embodiment, a method of controlling a data transfer to and/or from a WLAN device is provided where the WLAN device is connected to a data processing system that performs the method. The method comprises operating an operating system independent access controller, and operating a platform specific data block transfer engine. Operating the operating system independent access controller comprises preparing the platform specific data block transfer engine to perform the data transfer to and/or from the WLAN device.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
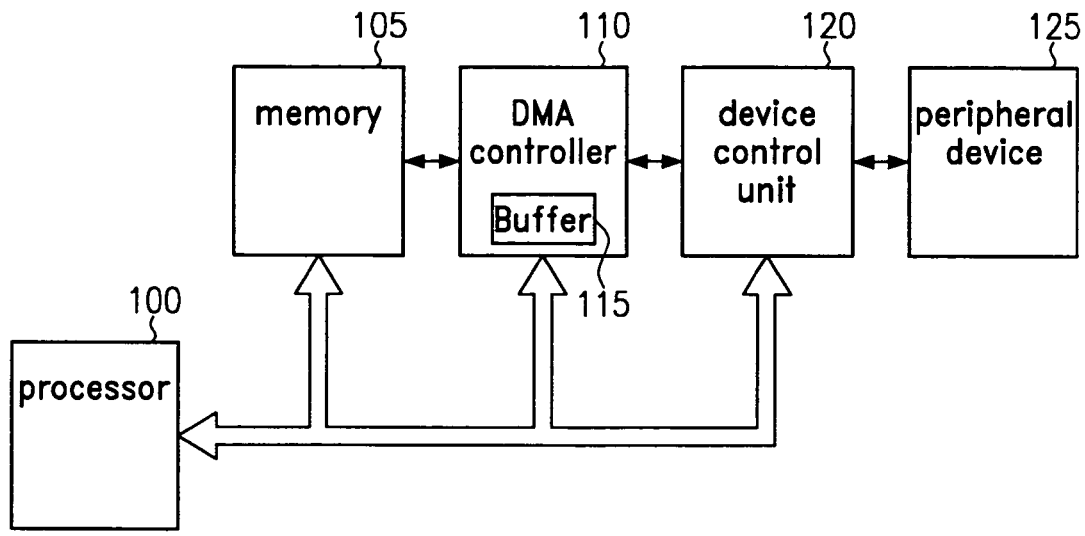
FIG. 1 is a block diagram illustrating a conventional system employing a DMA controller.
Figure 2:
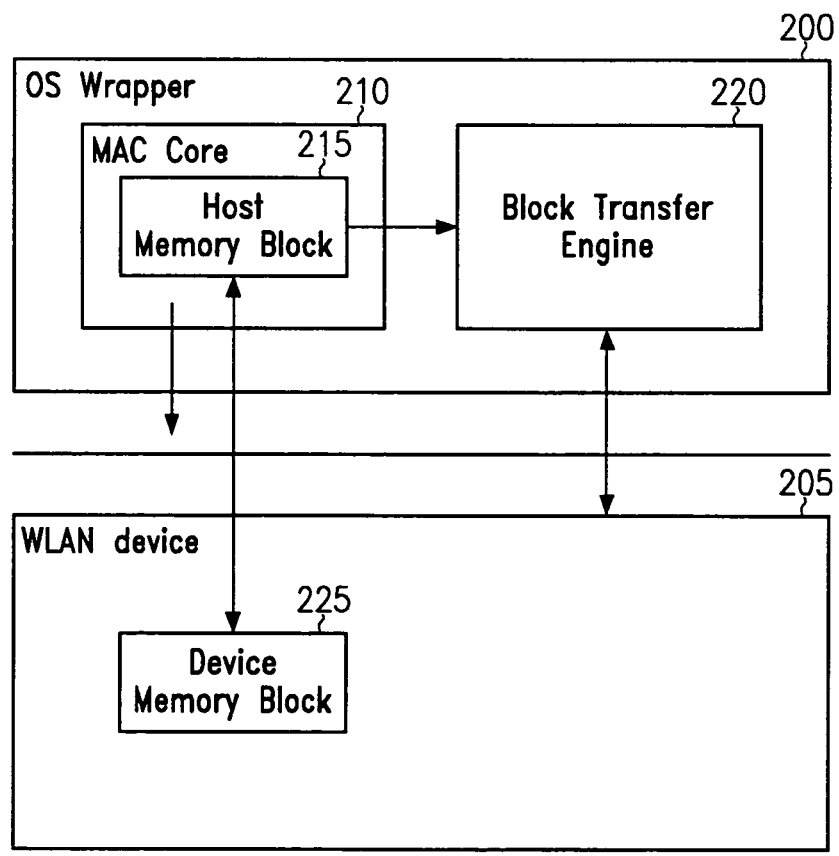
FIG. 2 is a software/hardware arrangement according to an embodiment.

Turning now to FIG. 2 which depicts a block diagram illustrating a software/hardware arrangement according to an embodiment, an OS (Operating System) wrapper 200 is provided that is interconnected to the WLAN device 205. The OS wrapper 200 is shown to comprise a MAC (Media Access Control) core 210 and a block transfer engine 220. The MAC core 210 comprises a host memory block or region 215 while the WLAN device 205 comprises a device memory block (or region) 225.

The OS wrapper 200 is a wrapper that may be operating system dependent. In one embodiment, the OS wrapper 200 is part of the operating system. In another embodiment, the OS wrapper 200 is not part of the operating system, but is distributed as separate software product.

A wrapper is defined to be software that encases resources. A wrapper may also append code or other software for some purposes. The resources encased in the present embodiment will be described below in more detail, noting that also the block transfer engine 220 may be considered such a resource.

The MAC core 210 provides access control functionality. It may be described to relate to the MAC sublayer which is part of the data link layer that supports topology-dependent functions and uses the services of the physical layer to provide services to the logic link control.

Before discussing the modes of operation of the architecture shown in FIG. 2, some details with respect to the resources are provided that may be used in the embodiments.

Generally, communications between processors may be available in the embodiment using messages sent to queues. For attaching data to messages, pointers to the data may be attached. The respective memory may then be needed to be allocated from shared memory. Memory which is intended to be used as a shared resource may be allocated using a predefined parameter. This allows access from all software blocks of the driver.

A function call may be available to get a list of hardware resources available. The list may contain two or more elements such as the PCI (Peripheral Component Interconnect) configuration space and a memory mapped register file. A resource identifier may be used for hardware access. The following hardware resource types may be defined: a configuration space, a mapped memory, an I/O (Input/Output) space, and the availability of block transfer functionality.

A call of the resource list function may return a pointer to a linked list of resource descriptors. The descriptors hold information about the hardware found. Only the resource type element in a descriptor may be of interest for the MAC core 210. It provides the necessary information to select the right resource when accessing the WLAN hardware 205. The pointer to the resource descriptor may be provided with every call to access hardware, allowing the OS wrapper 200 to identify the resource access requested. A pointer may be provided for allowing the OS wrapper 200 to attach data to this structure. The OS wrapper 200 may use this OS dependent data structure to identify the resource. It may be defined in the OS wrapper 200 and not used by the MAC core 210.

Resource access may be available using generic functions. The OS wrapper 200 of the present embodiment is responsible to take care of the type of bus the hardware is connected to. To select the right resource (between memory mapped registers and the PCI configuration space), the resource descriptor corresponding to the selected resource may be passed to read and write functions.

The operating system independent MAC core 210 may have the following functions available to access memory mapped registers, I/O space, and the PCI configuration space: write functions for write accesses, with given parameters such as adapter, resource, offset and value; and read functions for read accesses, with given parameters such as adapter, resource, offset and pointer to a value. The write and read access functions may support 8, 16 and 32-bit accesses. As mentioned above, a special resource in the resource list of the present embodiment is the block transfer resource. It allows the operating system independent MAC core 210 to initiate a memory block transfer from the host CPU memory to a location in the device 205 and vice versa. Access to the block transfer resource may be done using the 32-bit read and write access functions.

It is to be noted that the block transfer resource 220 does abstract this transfer. It may be used in systems where no bus master DMA from the WLAN device 205 to the host memory and vice versa is available.

A block transfer may generally be described to be a process, initiated by a single action, of transferring one or more blocks of data.

The location in the device 205 is not necessarily a block of memory. It may be only a register or memory window written with the stream of data representing the block to transfer. The implementation of this block transfer may be a memory copy operation to an interface mapped directly to the host CPU address space, a DMA operation utilizing an available DMA engine on the host, or any other transfer mechanism between the host CPU memory and the WLAN device 205.

In the present embodiment, the block transfer resource 220 provides a number of features including the transfer from host CPU memory to the WLAN device 205, a transfer from the WLAN device 205 to host CPU memory, and the use of a linked list of memory blocks as source and destination of the transfer. The use of a linked list may, for instance, allow to utilize scatter-gather DMA functionality.

The block transfer resource 220 of the present embodiment may provide a number of virtual registers for programming the block transfer state machine. Examples of the virtual registers are one or more host CPU address registers, a device address register, a transfer length register, a command register, and a status register.

When writing the host CPU address, the highest 32 bits may be assumed to be zero if they are not written. All other virtual registers not explicitly written may be assumed to be invalid by the state machine. A programming sequence for the state machine may be finished with writing a command using the command register. The status information is valid after sending a command to the block transfer state machine.

Examples of block transfer commands are a read command for starting a read block transfer from the WLAN device 205 to the host CPU memory, a write command to start a write block transfer from the host CPU memory to the WLAN device 205, an abort command to abort the programming sequence, and a "more" command to indicate that more information follows. The use of the commands will be described in more detail below.

When the block transfer is finished, an interrupt may either be generated by hardware used or a software interrupt may be used to signal this asynchronous event to the system. When handling this interrupt, the deferred procedure registered by the MAC core 210 may be called. Further, a software interrupt bit in an interrupt status word may be set to signal the source of the interrupt.

Figure 3:
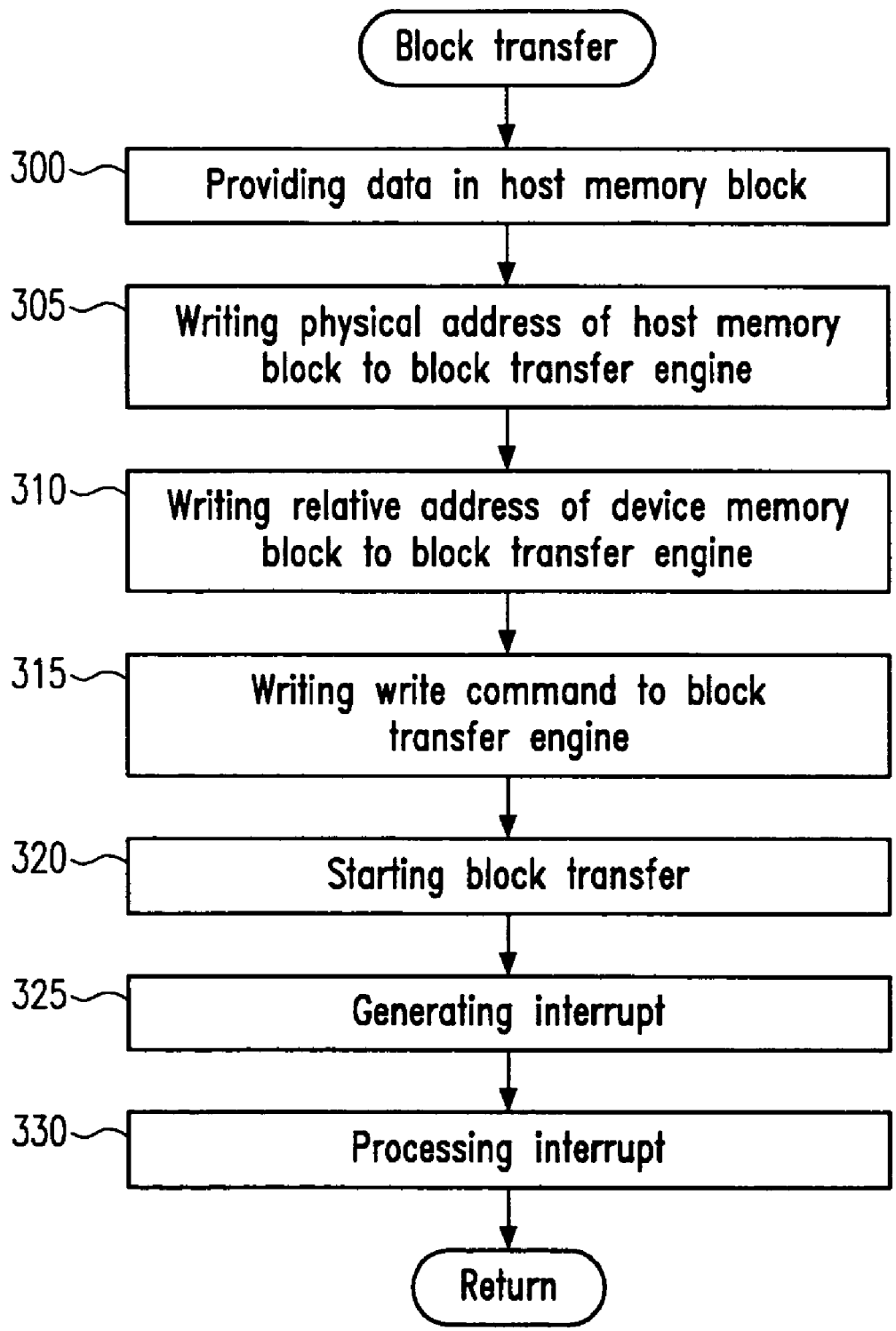
FIG. 3 is a flow chart illustrating the use of the block transfer function in a write transfer example according to an embodiment.

Turning now to FIG. 3, an example for a block transfer is provided. As mentioned above, block transfer may be used in particular when no bus master DMA is available in the WLAN device 205. In this case, the block transfer function 220 may take care of an efficient transfer of the data between the host memory block 215 and the device memory block 225.

The block transfer engine 220 may therefore be part of the OS wrapper 200 and, due to this, it may be able to make use of platform dependent interfaces or hardware support. An example for this would be the use of a DMA engine available on the host system to do an efficient memory-to-memory transfer.

In the block transfer example of FIG. 3, a data block is transferred from the host to the WLAN device 205. In step 300, the MAC core 210 provides the data in the host memory block 215. The MAC core 210 then writes the physical address of the host memory block 215 to the block transfer engine 220 in step 305, using the virtual host address registers.

Further, the MAC core 210 writes the relative address of the device memory block 225 to the block transfer engine 220 in step 310, using the virtual device address register.

After that, the MAC core 210 starts the transfer in step 315 by writing a write command to the block transfer engine 220. The block transfer is then started by the block transfer engine 220, and the data is copied from the host memory block 215 to the device memory block 225.

Upon finishing the transfer, an interrupt may be generated by real hardware used, or a software interrupt will be generated. The interrupt may be transferred to the MAC core 210 like any other interrupt that is signaled by the WLAN hardware 205. The interrupt indicates the end of a block transfer operation. The MAC core 210 may then retrieve the status of the transfer by reading the virtual status register of the block transfer engine 220.

In an embodiment, the block transfer engine is also capable of transferring fragmented memory blocks. To be able to cope with fragmented memory on both the host and the device side of the transfer, the block transfer engine 220 supports the "more" data command. If a first address is written and more addresses are to follow, this command is transferred to the block transfer engine 220. Subsequent addresses are handled as part of a list of blocks to be transferred. Each address may be accompanied by a length indication. With this handling, it does not matter whether none, only one, or both memory blocks 215, 225 are fragmented.

Given the above description of the various embodiments, a block transfer technique is provided that abstracts data transfer and makes it possible to be used independently from the used hardware or operating system. The transfer may use DMA but is not limited to this mechanism. It is to be noted that the block transfer engine 220 may have a variety of interfaces to the WLAN device 205, such as busses, host specific DMA engines, shared memory, etc. The described way of abstraction allows to split software in operating system independent parts regardless of the capabilities of the platform this software is running on.

It is further to be noted that the embodiments provide other advantages. For instance, the described block transfer technique improves reliability and efficiency. Further, the component parts may be reduced, leading to reduced manufacturing costs.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A data processing system for controlling a data transfer to and/or from a WLAN (Wireless Local Area Network) device connected to the data processing system, comprising:
   an operating system independent access controller; and
   a platform specific data block transfer engine,
   wherein said operating system independent access controller is configured to prepare said platform specific data block transfer engine to perform said data transfer to and/or from said WLAN device, and wherein said operating system independent access controller is configured to receive an interrupt indicating the end of said data transfer.

2. The data processing system of claim 1, wherein said platform specific data block transfer engine is an operating system dependent data block transfer engine.

3. The data processing system of claim 1, wherein said platform specific data block transfer engine is a hardware dependent data block transfer engine.

4. The data processing system of claim 1, further comprising:
   a host memory region storing data to be transferred to and/or received from said WLAN device.

5. The data processing system of claim 4, wherein said host memory region is comprised in said operating system independent access controller.

6. The data processing system of claim 4, wherein said operating system independent access controller is configured to write a physical address of a host memory block in said host memory region to said platform specific data block transfer engine for preparing said platform specific data block transfer engine to perform said data transfer to and/or from said WLAN device.

7. The data processing system of claim 1, wherein said operating system independent access controller is configured to write a relative address of a device memory block in a device memory region of said WLAN device to said platform specific data block transfer engine for preparing said platform specific data block transfer engine to perform said data transfer to and/or from said WLAN device.

8. The data processing system of claim 1, wherein said operating system independent access controller is capable of sending a read command to said platform specific data block transfer engine to prepare said platform specific data block block transfer engine to perform a data transfer from said WLAN device to host memory.

9. The data processing system of claim 1, wherein said operating system independent access controller is capable of sending a write command to said platform specific data block transfer engine to prepare said platform specific data block transfer engine to perform a data transfer from host memory to said WLAN device.

10. The data processing system of claim 1, wherein said interrupt is an interrupt generated by said WLAN device.

11. The data processing system of claim 1, wherein said interrupt is a software interrupt.

12. The data processing system of claim 1, wherein said operating system independent access controller is configured to read a status register of said platform specific data block transfer engine after having finished said data transfer.

13. The data processing system of claim 1, wherein said operating system independent access controller and said platform specific data block transfer engine are comprised in an operating system dependent wrapper.

14. The data processing system of claim 13, wherein said operating system dependent wrapper supports a function call to obtain a list of hardware resources, said hardware resources being one of a configuration space, a mapped memory, an input/output space, and the availability of block transfer functionality.

15. The data processing system of claim 1, wherein said platform specific data block transfer engine is capable of performing a memory copy operation to an interface mapped directly into the host CPU (Central Processing Unit) address space.

16. The data processing system of claim 1, wherein said platform specific data block transfer engine is capable of performing a DMA (Direct Memory Access) operation.

17. The data processing system of claim 1, wherein said operating system independent access controller and said platform specific data block transfer engine are capable of performing data transfers of multiple fragmented memory blocks.

18. The data processing system of claim 1, wherein said operating system independent access controller is configured to send a predefined command to said platform specific data block transfer engine after an address has been written to or read from, indicating that at least one more address is following.

19. The data processing system of claim 1, wherein said operating system independent access controller is configured to write addresses to said platform specific data block transfer engine for preparing said platform specific data block transfer engine to perform said data transfer to and/or from said WLAN device, said addresses being accompanied by length indications.

20. The data processing system of claim 1, wherein said platform specific data block transfer engine comprises a set of virtual registers storing a host address, a device address, a length of a data block transfer, a command, and/or a status.

21. The data processing system of claim 1, wherein said platform specific data block transfer engine is adapted to use a linked list of memory blocks as source and destination of said data transfer.

22. A computer-readable storage medium storing instructions that when executed by a processor of a data processing system, operate said data processing system to control a data transfer to and/or from a WLAN (Wireless Local Area Network) device connected to said data processing system, said computer-readable storage medium comprising:

instructions to implement an operating system independent access controller; and instructions to implement a platform-specific data block transfer engine, wherein said operating system independent access controller is configured to prepare said platform specific data block transfer engine to perform said data transfer to and/or from said WLAN device, and wherein said operating system independent access controller is configured to receive an interrupt indicating the end of said data transfer.

23. A method of controlling a data transfer to and/or from a WLAN (Wireless Local Area Network) device connected to a data processing system performing the method, the method comprising:

operating an operating system independent access controller; and operating a platform specific data block transfer engine, wherein operating said operating system independent access controller comprises:

preparing said platform specific data block transfer engine to perform said data transfer to and/or from said WLAN device, and receiving an interrupt indicating the end of said data transfer.

24. The method of claim 23, wherein said platform specific data block transfer engine is operated in a manner dependent on the operating system used.

25. The method of claim 23, wherein said platform specific data block transfer engine is operated in a manner dependent on the hardware used.

26. The method of claim 23 further comprising:

storing data to be transferred to and/or received from said WLAN device.

27. The method of claim 26, wherein said step of storing data is performed by said operating system independent access controller.

28. The method of claim 26, wherein said step of operating said operating system independent access controller comprises:

writing a physical address of a host memory block of the stored data to said platform specific data block transfer engine for preparing said platform specific data block transfer engine to perform said data transfer to and/or from said WLAN device.

29. The method of claim 23, wherein said step of operating said operating system independent access controller comprises:

writing a relative address of a device memory block in a device memory region of said WLAN device to said platform specific data block transfer engine for preparing said platform specific data block transfer engine to perform said data transfer to and/or from said WLAN device.

30. The method of claim 23, wherein operating said operating system independent access controller comprises:

sending a read command to said platform specific data block transfer engine to prepare said platform specific data block transfer engine to perform a data transfer from said WLAN device to host memory.

31. The method of claim 23, wherein operating said operating system independent access controller comprises:

sending a write command to said platform specific data block transfer engine to prepare said platform specific data block transfer engine to perform a data transfer from host memory to said WLAN device.

32. The method of claim 23, wherein said interrupt is an interrupt generated by said WLAN device.

33. The method of claim 23 wherein said interrupt is a software interrupt.

34. The method of claim 23, wherein operating said operating system independent access controller comprises:
reading a status register of said platform specific data block transfer engine after having finished said data transfer.

35. The method of claim 23, wherein said operating system independent access controller and said platform specific data block transfer engine are comprised in an operating system dependent wrapper.

36. The method of claim 23, wherein said operating system dependent wrapper supports a function call to obtain a list of hardware resources, said hardware resources being one of a configuration space, a mapped memory, an input/output space, and the availability of block transfer functionality.

37. The method of claim 23, wherein operating said platform specific data block transfer engine comprises:
performing a memory copy operation to an interface mapped directly into a host CPU (Central Processing Unit) address space.

38. The method of claim 23, wherein operating said platform specific data block transfer engine comprises:
performing a DMA (Direct Memory Access) operation.

39. The method of claim 23, wherein operating said operating system independent access controller and said platform specific data block transfer engine comprises:
performing data transfers of multiple fragmented memory blocks.

40. The method of claim 23, wherein operating said operating system independent access controller comprises:
sending a predefined command to said platform specific data block transfer engine after an address has been written to or read from, indicating that at least one more address is following.

41. The method of claim 23, wherein operating said operating system independent access controller comprises:
writing addresses to said platform specific data block transfer engine for preparing said platform specific data block transfer engine to perform said data transfer to and/or from said WLAN device, said addresses being accompanied by length indications.

42. The method of claim 23, wherein said platform specific data block transfer engine comprises a set of virtual registers storing a host address, a device address, a length of a data block transfer, a command, and/or a status.

43. The method of claim 23, wherein operating said platform specific data block transfer engine comprises:
using a linked list of memory blocks as source and destination of said data transfer.

44. A data processing system for controlling the data transfer to and/or from a WLAN (Wireless Local Area Network) device connected to the data processing system, the data processing system comprising:
an operating system independent access controller;
a platform specific data block transfer engine; and
a host memory region storing data to be transferred to and/or received from said WLAN device;
wherein said operating system independent access controller is configured to prepare said platform specific data block transfer engine to perform said data transfer to and/or from WLAN device;
wherein preparing said platform specific data block transfer engine comprises:
writing an address of said host memory region, and address of a device memory region, and a block transfer command to said platform specific data block transfer engine.

45. A computer-readable storage medium storing instructions that, when executed by a processor of a data processing system operate said data processing system to control a data transfer to and/or from a WLAN (Wireless Local Area Network) device connected to said data processing system, said computer-readable storage medium comprising:
instructions to implement an operating system independent access controller; and
instructions to implement a platform-specific data block transfer engine;
wherein said operating system independent access controller is configured to prepare said platform specific data block transfer engine to perform said data transfer to and/or from said WLAN device, by writing an address of a host memory region that stores data to be transferred to and/or received from said WLAN device, an address of a device memory region, and a block transfer command to said platform specific data block transfer engine.

46. A method of controlling a data transfer to and/or from a WLAN (Wireless Local Area Network) device connected to a data processing system performing the method, the method comprising:
operating an operating system independent access controller; and
operating a platform-specific data block transfer engine;
wherein operating said operating system independent access controller comprises:
preparing said platform specific data block transfer engine to perform said data transfer to and/or from said WLAN device by writing an address of a host memory region that stores data to be transferred to and/or received from said WLAN device and an address of a device memory region, and a block transfer command to said platform specific data block transfer engine.

* * * * *